(12) United States Patent
Linner

(10) Patent No.: US 6,295,792 B1
(45) Date of Patent: Oct. 2, 2001

(54) DEVICE AND PROCESS IN A TUBE FILLING MACHINE

(75) Inventor: Hans Linner, Kalmar (SE)

(73) Assignee: Norden Pac Development AB (SE)

( * ) Notice: Subject to any disclaimer, the term of this patent is extended or adjusted under 35 U.S.C. 154(b) by 0 days.

(21) Appl. No.: 09/424,305

(22) PCT Filed: May 5, 1998

(86) PCT No.: PCT/SE98/00821

§ 371 Date: Nov. 22, 1999

§ 102(e) Date: Nov. 22, 1999

(87) PCT Pub. No.: WO98/54054

PCT Pub. Date: Dec. 3, 1998

(30) Foreign Application Priority Data

May 27, 1997 (SE) .................................... 9701968

(51) Int. Cl.⁷ .................................................. B65B 43/00
(52) U.S. Cl. ............................................. 53/452; 53/478
(58) Field of Search ............................ 53/246, 452, 478, 53/485; 493/156, 158, 291, 296, 308

(56) References Cited

U.S. PATENT DOCUMENTS

| | | |
|---|---|---|
| 3,788,520 | 1/1974 | Dukess .................... 222/94 |
| 4,058,054 | 11/1977 | Markman . |
| 5,507,222 | 4/1996 | Reavey . |

FOREIGN PATENT DOCUMENTS

| | | |
|---|---|---|
| 210557 | 10/1940 | (CH) . |
| 619 902 | 10/1980 | (CH) . |
| 41 39 282 | 5/1992 | (DE) . |
| 44 02 880 | 9/1994 | (DE) . |
| 195 22 169 A1 | 1/1997 | (DE) . |
| 94/19251 | 9/1994 | (WO) . |

*Primary Examiner*—Peter Vo
*Assistant Examiner*—Nathaniel Chukwurah
(74) *Attorney, Agent, or Firm*—Lerner, David, Littenberg, Krumholz & Mentlik, LLP

(57) ABSTRACT

The invention relates to a device for extending an intermediate wall arranged in a packaging tube's longitudinal direction with a surplus of material as measured between the attachment locations of the intermediate wall. Means are provided for orientating the intermediate tube's attachment locations to predetermined positions and application means (13) is introduced on either side of the intermediate wall and has means (12c, 12d) for extending the intermediate wall. External welding jaws (15, 15a) are provided at the attachment locations and are arranged to attach the extended intermediate wall to the inside of the tube.

14 Claims, 4 Drawing Sheets

DEVICE AND PROCESS IN A TUBE FILLING MACHINE

FIELD OF THE INVENTION

The invention relates to a device and a process for handling packaging tubes having an intermediate wall of flexible material or the like. The device is particularly suitable for inclusion in an intermittently-operating tube filler in a processing station upstream of the filling station.

BACKGROUND TO THE INVENTION

Packages which are constructed to contain different types of product components in respective separate packaging volumes provide the possibility of supplying, as a final product from the package, a product mix comprising components which, as a result of their nature, do not tolerate being mixed in a common packaging volume and being stored there for long periods.

A type of packaging for this basic purpose is the blister packaging type, where the product components are packaged in separate packaging units on a supporting underlay, normally a sheet of cardboard material. For obtaining the final product mix, the units are individually removed from the sheet and the mixing is effected by separate emptying and mixing of products from individual units.

Another type of packaging for the application in question is the double-tube or multi-tube as disclosed in published PCT application WO 94/19251. In this packaging construction, tubes provided with breast-portions are held together by a common end-piece, and emptying openings for the individual tubes are passed through the end piece. The tube contents in the individual tubes is pressed out in the traditional manner through the openings and is mixed to the intended final product mixture.

A dual-compartment tube, for example according to DE-A-19522169, with a flexible intermediate wall, represents a further type of packaging tube for said purpose, namely the provision of a packaging construction which allows containing of different product components and common emptying of these.

This tube, which is provided with an intermediate wall, and which in practice has shown itself to be the most suitable from the point of view of production, has an intermediate wall fixedly attached to two diametrically opposed fixing locations on the inside of the tube body and has a surplus of material as measured between the fixing locations.

The tube is intended to be filled in a conventional way from the end of the tube which is opposite to the tube breast. However it has shown itself to be the case that the surplus material of the intermediate wall gives very highly-varying accessibility for the filling nozzles due to the tendency of the material of the intermediate wall to form itself with greatly varying curvature at the filling ends and thereby the openings for the filling nozzles will vary in a manner which is undefined in advance.

In U.S. Pat. No. 3,788,520 there is disclosed another type of dual-compartment tube, the intermediate wall of which (FIGS. 1 and 2) is arranged as a bellows divider for permitting various amounts of material to be deposited in the two compartments formed by the divider.

This tube might have a filling opening which is not as undefined as the one in DE-A-19522169 but the tube as such is not of the type which would be easily processable in traditional filling machines

OBJECT OF THE INVENTION

The object of the invention is to provide a device and a process for intermediate-wall tubes, primarily of the basic type as in DE-A-19522169 but which give well-defined access openings for the filling nozzles, in advance and thereby allow high speed production of filled intermediate wall tubes in a reliably-functioning and cost-effective manner.

SUMMARY OF THE INVENTION

The invention solves the problem of undefined filling openings in intermediate wall tubes by providing a device according to appended claim 1. The other claims define additional features as well as a process for realising said object.

BRIEF DESCRIPTION OF THE DRAWINGS

The invention will now be described with reference to the accompanying drawings which depict embodiments of the invention, in which.

Figures 1, 2:
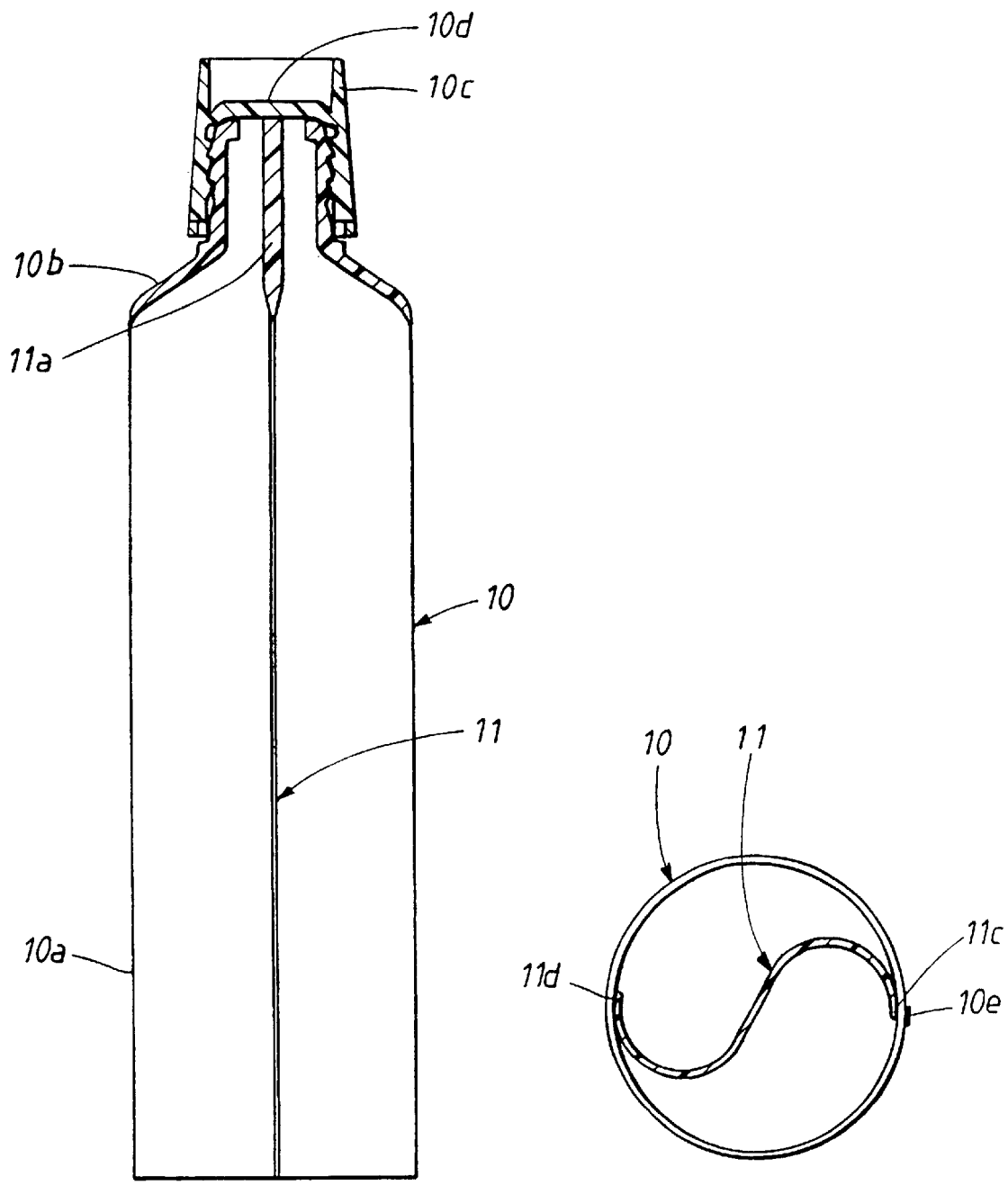
FIG. 1 shows a cross-section of an intermediate-wall tube intended to be processed according to the invention.
FIG. 2 shows a cross-section of the tube in FIG. 1, FIGS. 3 and 4 show examples of curvatures of the intermediate wall of FIG. 1 which occur in practice.

The tube 10 in FIG. 1, as seen from the outside, is a traditional packaging tube comprising a tube body 10, tube breast 10b and closure 10c. The material in the tube body is flexible in the normal way and consists of a suitable plastic material, e.g. polyethylene, polypropylene, etc., or a laminate of plastic and metal. The tube breast 10b can be formed in one piece with the tube body, or it can be welded onto it, and consists of a material which gives the required stability, normally plastic material of a corresponding type to that in the tube body, possibly with an inlay of metal so as to achieve barrier characteristics. The closure 10c is a traditional cap provided with threads, which has a central portion 10d for sealing against the upper materially-thickened portion 11a of the intermediate wall 11 of the tube.

As shown in FIG. 2, the intermediate wall 11 is fixedly attached to the inside of the tube body 10 (also to the breast 10b) at two fixing locations 11c, 11d, which are diametrically opposed in the tube body. The intermediate wall has a surplus of material as measured between the fixing locations 11c, 11d. The material of the intermediate wall 11 is a flexible material, typically of the same type of plastic as is found on the inner wall of the tube, e.g. polyethylene.

The flexible character of the material of the intermediate wall is not however always capable of creating the ideal curvature of the intermediate wall shown in FIG. 2, where well-defined filling openings are apparent for the introduction of the filling nozzles.

Figure 3:
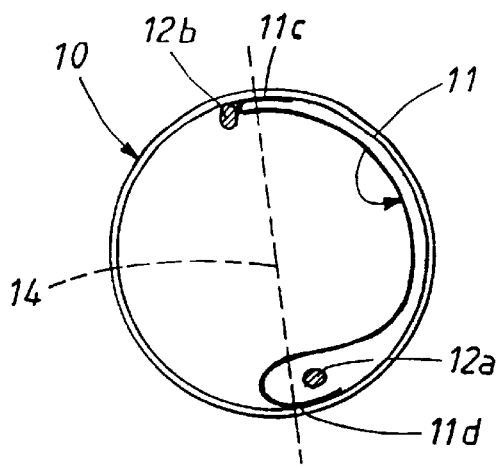
Figure 4:
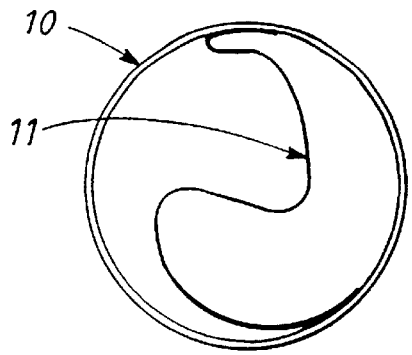

In the same way the curvature of the intermediate wall 11 varies very appreciably, from the curvature according to FIG. 3 where the intermediate wall lies very close to the tube wall along half of its circumference, to innumerable forms in-between, for example the one shown in FIG. 4.

In FIG. 2 one attachment location 11c for the intermediate wall 11 is marked externally by a machine-readable marking or code 10e. Corresponding codes can be arranged externally at the other attachment location 11d, e.g. for the case where the attachments are not diametrically opposed in a tube body with circular cross-section, or if the tube cross-section varies from circular.

By this placing of external marking or markings it is possible to define the location for introduction of probe tips 12a, 12b of an application device 13 in the chamber in the packaging machine.

Figure 5:
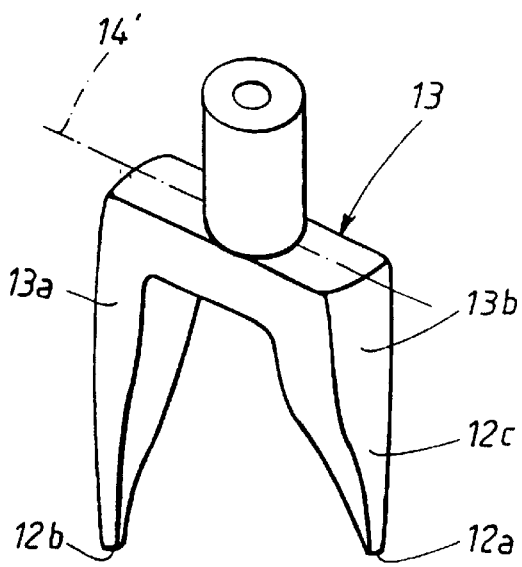
FIG. 5 shows a perspective view of an embodiment of an extending device, or application device, intended to be applied against the intermediate wall.

From FIG. 5 and FIG. 3 the respective orientation of the probe tips relative to imaginary lines 14, 14' can be seen, whereby the line 14 extends through the intermediate wall's attachment locations to the inner wall and whereby the line 14' defines a line of symmetry for the probe tips of the application device 13. As is clear from FIG. 3, after the orientation code 10e has been sensed for fixing the tube's position, the probe tips 12a, 12b will, due to their positioning relative to the line of symmetry 14', end up on opposite sides of the line 14 which joins the attachment locations 11c, 11d.

Figure 6:
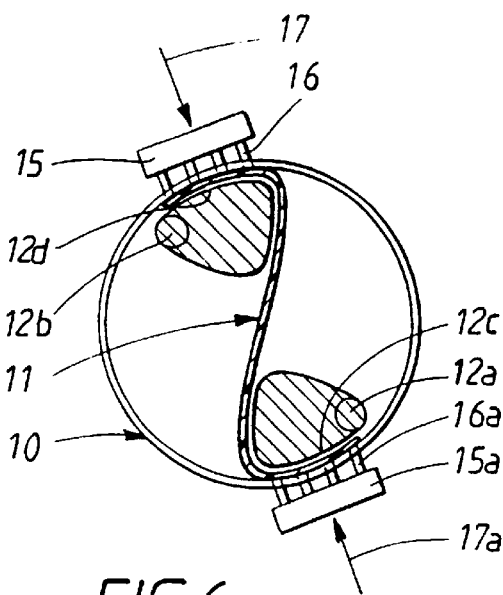
FIG. 6 shows a schematic cross-section of the applied extending device and external welding jaws for fixing the intermediate wall in an extended state.

In this way a basic aspect of the device according to the invention has been fulfilled. FIG. 6 shows how the application device 13 is additionally provided with cam surfaces 12c, 12d, the curvature of which, seen in a direction upwards along the cam surfaces, is adapted to the inner curvature of the tube wall. In FIG. 6 the location of the probe tips 12a, 12b is also shown schematically after the application device 13 has been lowered into the tube's filling opening and both legs 13a, 13b of the application device 13 have been fully employed for extending the intermediate wall 11.

At this point the cam surfaces of the legs lie tightly against the intermediate wall and press this against the inside of the tube wall. Externally arranged at these application locations are welding jaws 15, 15a which, in the shown embodiment, are provided with pins and together with these can be applied against the tube body in the direction of arrows 17, 17a. The pins 16, 16a penetrate the plastic material in the tube body and due to the fact that the pins and jaws are heated to welding temperature, heated plastic material is transported at heat sealing temperature through the holes made by the pins to the intermediate wall 11 in the application locations, so that with this produced application pressure and the plastic material transport as well as subsequent cooling, e.g. by cooling of the application device 13, the intermediate wall 11 is fixed to the inside of the tube and, after removal of the application device 13, the intermediate wall 11 remains in the extended condition according to FIG. 6 and thereby defines a pair of well-defined filling openings for the filling nozzles.

Figure 7:
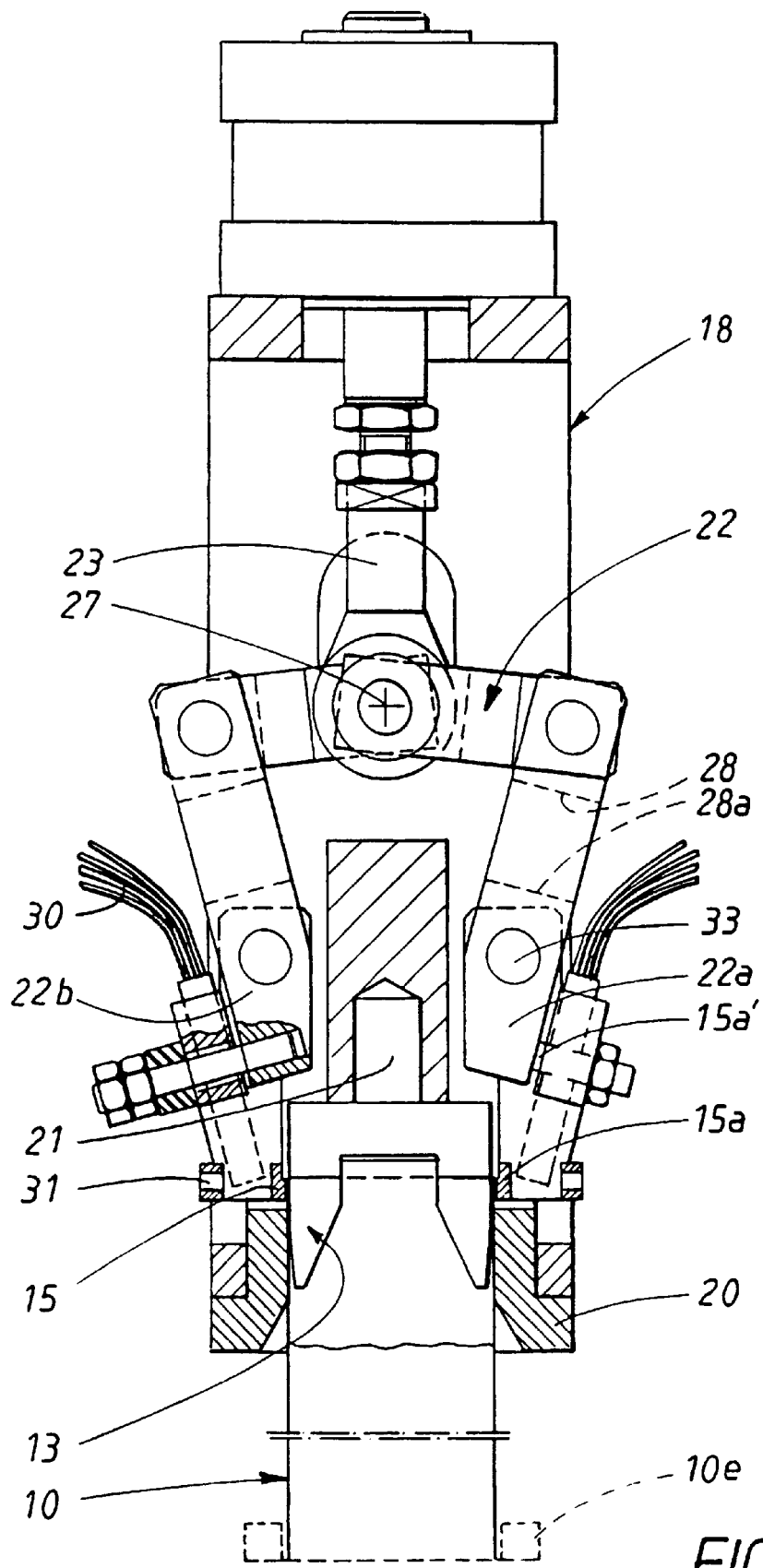
FIG. 7 shows a partial cross-sectional view of a device according to the invention intended to be fitted into a tube filling machine.

FIG. 7 shows an embodiment of an arrangement for achieving the function shown in principle in FIG. 6 which is however schematically depicted. The application device 13 shown in FIG. 5 is contained in a housing or holder 18 supported by arms 19, 19a (FIG. 8) in a tube filling machine. The tube filling machine is of the intermittently-operating type and the housing 18 is placed in a position upstream of the filling station, e.g. in a station where the tubes 10 are given the aforementioned, predetermined orientation, or after such a station. Alternatively, the arrangement according to FIG. 7 can be arranged separately from the tube filling machine.

At its lower end, the holder or housing 18 supports a tube end forming device 20, in which a tube body 10 has been introduced and is located in a position where the welding jaws 15, 15a are not yet operating against the outside of the tube in order to point weld the extended intermediate wall with the application device 13 as a counter-support. The application device 13 in the depicted embodiment is fixed to the housing 18 by means of a bolt 21 and is thereby vertically stationary in the tube filling machine.

The tube is supported by a tube holder 10e on an endless conveyor in the filling machine and is, as mentioned, orientated to the correct position relative to the probe tips 12a, 12b before, or at the latest when, it arrives at the intermediate wall extending station which contains the housing 18. The tube holder 10e is vertically adjustable upwardly and downwardly in the extending station, and the relative movement between the application device 13 and the tube end forming device 20 is achieved by displacement of the tube holder. Alternatively, the housing 18 with corresponding tube forming device 20 can of course be made vertically movable and the tubes indexed horizontally without vertical movement.

Figure 9:
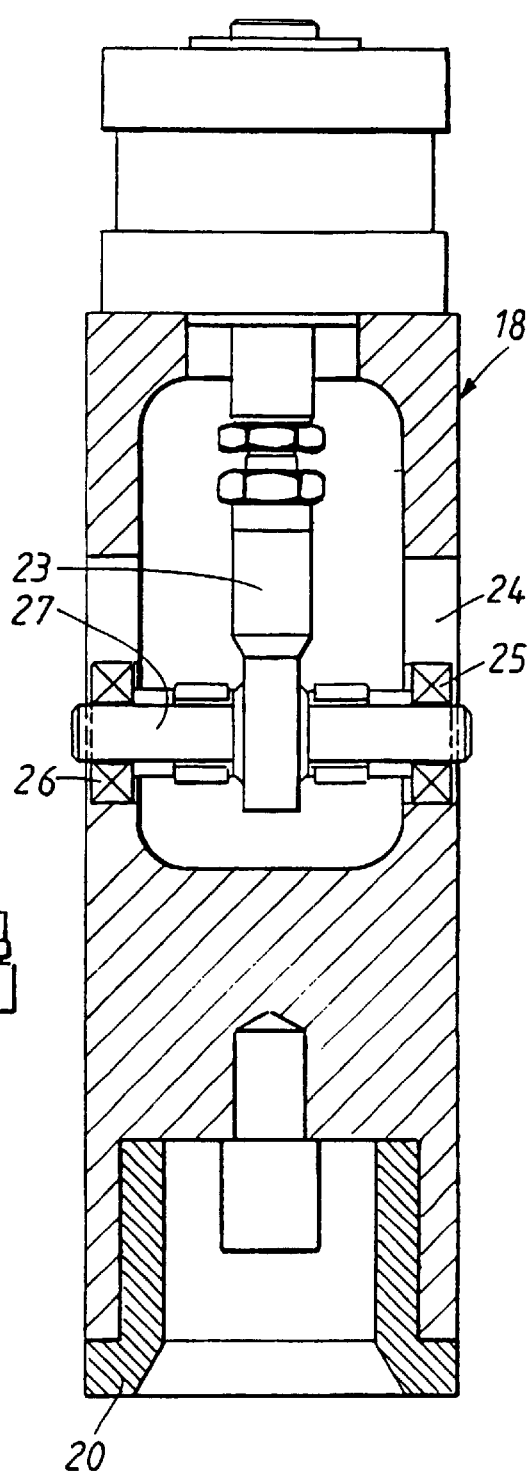
FIG. 9 shows the housing of FIG. 8 in partial cross-section.

The maneuvering of the welding jaws 15, 15a in the direction of arrows 17, 17a schematically shown in FIG. 6 is achieved in the embodiment in FIG. 7 by a link mechanism 22 which is connected with a vertically upwardly and downwardly displaceable drive shaft 23. The control of this movement is achieved by channels 24 in the wall of the housing 18 (FIG. 9) in which travel wheels 25, 26 with bearings. In the position shown in FIG. 7, the link mechanism 22 is in a position corresponding to the lower position of the shaft 27, whereby the welding jaws 15, 15a and their pins 16 are out of engagement with the tube 10 introduced in the tube end forming device 20. In FIG. 7, the location of the link mechanism in the shaft's upper position is shown in dashed lines 28, 28a, i.e. in the position where the link arms 22a, 22b, through attachments 15a' press the welding jaws 15, 15a against the tube, whereby the pins 16 penetrate the material in the tube wall and achieve the necessary transport of heat sealable material to the intermediate wall.

In the shown embodiment, the welding jaws are electrically heated and connection cables 30 are depicted in FIG. 7. The energy supply can be by impulse and it is therefore suitable to arrange the welding jaws with and an inlet and an outlet respectively for a cooling medium. In the figure, such a connection possibility is denoted by reference numeral 31.

Figure 8:
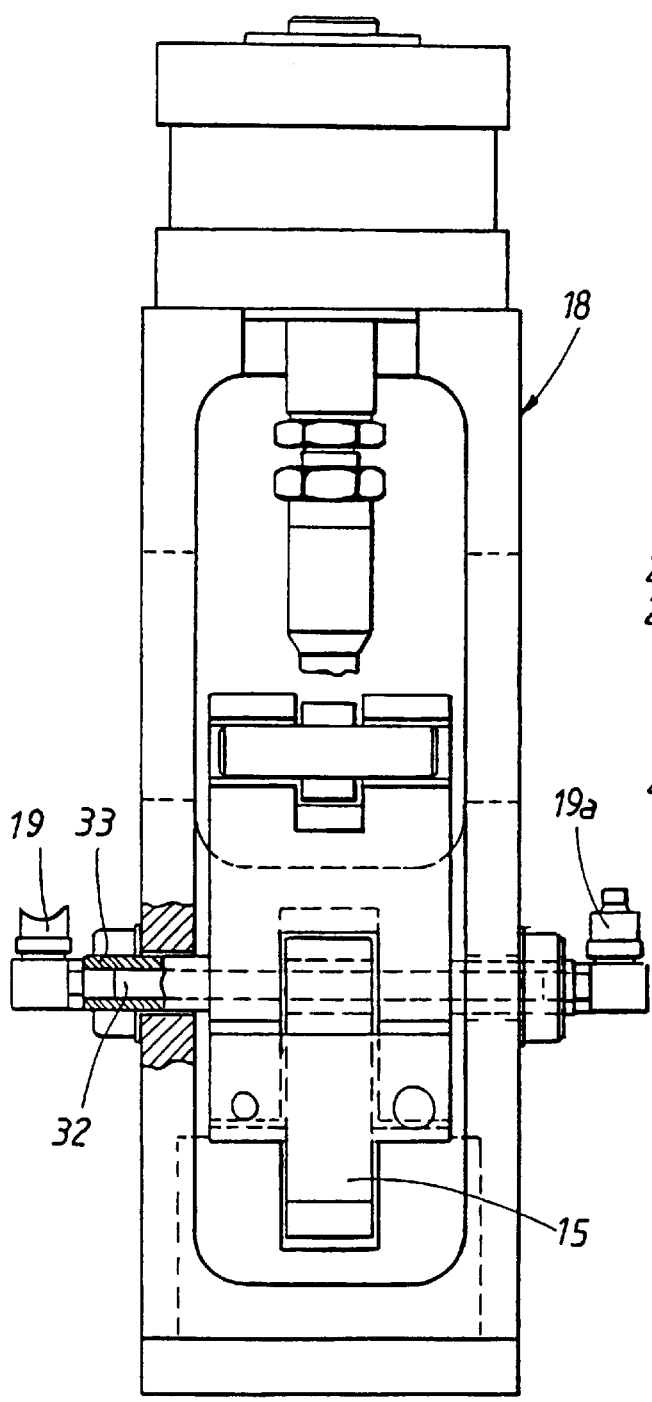
FIG. 8 shows, partly cut-away, the housing of the device of FIG. 7 from one side thereof.

It should be noted that the available time in the extending station approaches several tenths of a second in order to allow normal production speed. To obtain the previously mentioned cooling effect after fixing of the intermediate wall, it can also be suitable to provide arrangements for cooling of the housing 18 and then especially the application device 13. In FIG. 8, a cooling arrangement for the shaft 33 introduced through the housing is shown by the channel 32 which constitutes a part of the link mechanism 22. The application device 13, as mentioned, is supported by the housing 18 and is in heat/cooling transfer contact with the application device 13. Additional cooling arrangements can of course be necessary depending on the production speed and the material characteristics of tubes and intermediate walls.

In the description of the embodiments of the invention, tubes with substantially circular cross-section have been considered, which does not imply that the principle according to the invention is not applicable to other cross-sectional forms, the intention being that the invention should only be limited to that which is defined in the appended claims.

Additionally the application device which is discussed is described as a device in which, through vertical relative movement between the application device and a tube end forming device, the required extension of the intermediate wall is achieved. Additionally to such a vertical relative movement there may also be a rotational movement of the application device around the central axis of the tube end forming device.

What is claimed is:

1. Apparatus for processing a tube including an inner wall, a pair of attachment points extending along a length of said inner wall, a longitudinally extending intermediate wall having two sides and comprising flexible material attached between said attachment points, and a surplus of said flexible material with respect to a distance between said attachment points; said apparatus comprising orienting means for orienting said attachment points into predetermined positions, an applicator comprising a pair of probe tips carrying a corresponding pair of cam surfaces, whereby said probe tips can be introduced into said tube, one on each side of said intermediate wall, after said attachment points have been oriented into said predetermined positions, and whereby said cam surfaces can extend said intermediate wall and place said surplus against said inner wall; said apparatus further comprising attachment means for attaching said surplus to said inner wall.

2. The apparatus of claim 1 wherein said cam surfaces comprise direct continuations of said probe tips.

3. The apparatus of claim 1 wherein said attachment means comprises a pair of welding jaws.

4. The apparatus of claim 3 wherein said pair of welding jaws comprises a plurality of welding pins for penetrating said inner wall.

5. Apparatus for processing a tube including an inner wall, a pair of attachment points extending along a length of said inner wall, a longitudinally extending intermediate wall having two sides and comprising flexible material attached between said attachment points, and a surplus of said flexible material with respect to a distance between said attachment points; said apparatus comprising an intermittently operating packaging machine having an intermediate wall extending station; said machine including a machine frame supporting said station, feed means for sequentially feeding a plurality of said tubes to said station, and orienting means for orienting said attachment points into predetermined positions upstream of said station; said machine frame including a holder, a tube end former supported by said holder whereby said tube can be inserted into said tube end former, and an applicator supported by said holder whereby a gap accommodating said tube is formed between said tube end former and said applicator; said applicator including a pair of probe tips carrying a corresponding pair of cam surfaces, whereby said probe tips can be introduced into said tube, one on each side of said intermediate wall, after said attachment points have been oriented into said predetermined positions, and whereby said cam surfaces can extend said intermediate wall and place said surplus against said inner wall; said machine further including attachment means for attaching said surplus to said inner wall.

6. The apparatus of claim 5 wherein said cam surfaces comprise direct continuations of said probe tips.

7. The apparatus of claim 6 wherein said feed means includes a plurality of tube holders for carrying said plurality of tubes and for raising and lowering said tube for application of cam surfaces against said inner wall.

8. The apparatus of claim 7 wherein said attachment means comprises a pair of welding jaws.

9. The apparatus of claim 8 including welding jaw support means for supporting said welding jaws and providing a clamping force against said cam surfaces.

10. The apparatus of claim 9 wherein said pair of welding jaws comprises a plurality of welding pins for penetrating said inner wall.

11. The apparatus of claim 10 wherein said welding jaw support means includes a raisable and lowerable link system.

12. The apparatus of claim 5 wherein said tube end former has a central axis, and including applicator orientation means for rotating said probe tips around said central axis.

13. The apparatus of claim 5 including moving means for moving said probe tips and said tube end former relatively with respect to each other.

14. A method for processing a tube including an inner wall, a pair of attachment points extending along a length of said inner wall, a longitudinally extending intermediate wall having two sides and comprising flexible material attached between said attachment points, and a surplus of said flexible material with respect to a distance between said attachment points; said method comprising orienting said attachment points into predetermined positions, introducing a pair of probe tips carrying a pair of corresponding cam surfaces into said tube on either side of said intermediate wall after said attachment points have been oriented into said predetermined positions, extending said intermediate wall with said cam surfaces by placing said surplus against said inner wall, and attaching said surplus to said inner wall.

* * * * *

UNITED STATES PATENT AND TRADEMARK OFFICE
CERTIFICATE OF CORRECTION

PATENT NO. : 6,295,792 B1
DATED : October 2, 2001
INVENTOR(S) : Hans Linner

Page 1 of 1

It is certified that error appears in the above-identified patent and that said Letters Patent is hereby corrected as shown below:

Title page,
Item [57], ABSTRACT,
Line 4, delete "arc" and insert therefor -- are --.
Line 7, delete "(13)".
Line 8, delete "(12c, 12d)".
Line 9, delete "(15, 15a)".

Column 1,
Line 61, after "DE-A-19522169" insert -- , --.

Column 2,
After line 37, insert -- DETAILED DESCRIPTION --.

Column 4,
Line 44, delete "and".

Signed and Sealed this

Nineteenth Day of March, 2002

Attest:

JAMES E. ROGAN
Director of the United States Patent and Trademark Office

Attesting Officer